United States Patent
Palmlof

(10) Patent No.: US 7,411,023 B2
(45) Date of Patent: Aug. 12, 2008

(54) PIPE FOR HOT FLUIDS

(75) Inventor: Magnus Palmlof, Vastra Frolunda (SE)

(73) Assignee: Borealis Technology Oy, Porvoo (FI)

( * ) Notice: Subject to any disclaimer, the term of this patent is extended or adjusted under 35 U.S.C. 154(b) by 124 days.

(21) Appl. No.: 10/489,088

(22) PCT Filed: Oct. 15, 2002

(86) PCT No.: PCT/SE02/01868

§ 371 (c)(1),
(2), (4) Date: Mar. 9, 2004

(87) PCT Pub. No.: WO03/033586

PCT Pub. Date: Apr. 24, 2003

(65) Prior Publication Data

US 2004/0242785 A1    Dec. 2, 2004

(30) Foreign Application Priority Data

Oct. 16, 2001  (SE) .................................. 0103425

(51) Int. Cl.
C08L 23/00   (2006.01)
C08L 23/04   (2006.01)
C08F 210/00  (2006.01)
C08F 10/14   (2006.01)
C08F 10/04   (2006.01)
C08F 110/02  (2006.01)

(52) U.S. Cl. ....................... 525/191; 525/240; 526/348; 526/348.2; 526/348.4; 526/348.6; 526/352; 526/352.2

(58) Field of Classification Search .................. 526/348, 526/348.2, 348.4, 348.5, 348.6, 352, 352.2; 525/191, 240

See application file for complete search history.

(56) References Cited

U.S. PATENT DOCUMENTS

| 5,306,775 | A | 4/1994 | Martin et al. |
| 6,329,054 | B1 * | 12/2001 | Rogestedt et al. ............ 428/378 |
| 6,441,096 | B1 * | 8/2002 | Backman et al. ............. 525/240 |
| 6,545,093 | B1 * | 4/2003 | de Lange et al. ............. 525/191 |
| 6,642,323 | B1 * | 11/2003 | Myhre et al. .................. 526/64 |
| 6,878,784 | B1 * | 4/2005 | Asumalahti et al. ........... 526/64 |
| 2002/0004571 | A1 | 1/2002 | Shroeder et al. |
| 2003/0149162 | A1 * | 8/2003 | Ahlstrand .................... 524/495 |
| 2004/0157988 | A1 * | 8/2004 | Miserque et al. .............. 525/53 |
| 2004/0266966 | A1 * | 12/2004 | Schramm et al. ............. 526/352 |

FOREIGN PATENT DOCUMENTS

| EP | 0 533 155 | 3/1993 |
| EP | 1 146 078 | 10/2001 |
| WO | WO 00/01765 | 1/2000 |

* cited by examiner

*Primary Examiner*—Nathan M Nutter
(74) *Attorney, Agent, or Firm*—Merchant & Gould P.C.

(57) ABSTRACT

A polymer pipe for hot fluids, usually hot water is described. The pipe is characterised in that it comprises a multimodal polyethylene with a high molecular weight (HMW) fraction and a low molecular weight (LMW) fraction where said HMW fraction has a density of at least 0.920 g/cm$^3$, and that the multimodal polyethylene has a density of 0.921-0.950 g/cm$^3$ and has a time to failure at 95° C. and 3.6 MPa of at least 165 h determined according to DIN 16 833 and a modulus of elasticity of at most 900 MPa determined according to ISO 527-2/1B. Preferably, the multimodal polyethylene is a bimodal polyethylene, the LMW fraction having a density of 0.955-0.975 g/cm$^3$, the HMW fraction having a density of 0.920-0.940 g/cm$^3$, and the weight ratio of the LMW fraction to the HMW fraction being from 30:70 to 55:45.

7 Claims, No Drawings

PIPE FOR HOT FLUIDS

FIELD OF THE INVENTION

The present invention relates to a polymer pipe for hot fluids, such as hot water.

BACKGROUND OF THE INVENTION

Nowadays, polymer materials are frequently used for pipes for various purposes, such as fluid transport, i.e. transport of liquid or gas, e.g. water or natural gas, during which the fluid can be pressurised. Moreover, the transported fluid may have varying temperatures, usually within the temperature range from about 0° C. to about 50° C. Such pipes are preferably made of polyolefin plastic, usually unimodal polyethylene such as medium density polyethylene (MDPE; density: 0.930-0.942 g/cm$^3$) and high density polyethylene (HDPE; density: 0.945-0.965 g/cm$^3$).

According to WO 00/01765 a polymer composition for pipes is known comprising a multimodal polyethylene with a density of 0.930-0.965 g/cm$^3$, an MFR$_5$ of 0.2-1.2 g/10 min, an $M_n$ of 8000-15000, an $M_w$ of 180-330×10$^3$, and an $M_w/M_n$ of 20-35, said multimodal polyethylene comprising a low molecular weight (LMW) ethylene homopolymer fraction and a high molecular weight (HMW) ethylene copolymer fraction, said HMW fraction having a lower molecular weight limit of 3500, and a weight ratio of the LMW fraction to the HMW fraction of (35-55):(65:45). The polymer composition according to WO 00/01765 is intended for pressurised pipes for the transport of gases and liquids such as cold water. This composition is not suitable for pipes for hot fluids such as hot water, according to present hot water polyethylene pipe standards, such as DIN 16 833.

By the expression "hot fluid" used herein is meant a gas or a liquid, usually water, having a temperature of at least 60° C., usually 60-100° C., such as 70-90° C.

Because of the high temperatures (at least 60° C.) involved, polymer pipes for hot fluids such as hot water, represent a particularly problematic type of polymer pipe. Not only must a polymer pipe for hot fluids such as hot water, fulfil the requirements necessary for other ordinary polymer pipes, such as cold water pipes, but in addition it must withstand the strain associated with hot fluid, usually hot water. The temperature of the hot water in a hot water pipe is normally at least 60-70° C. which means that the pipe must be able to withstand a higher temperature than that for a secure long term use. According to the standard DIN 16 833 a hot water pipe must meet the requirement of at least 165 h before failure at 95° C. and 3.6 MPa pressure. In this connection it should be understood that an increase of 10° C. of the water temperature means a decrease of the working life of the pipe by roughly 50%.

A specific type of hot water polymer pipe that involves even greater problems is floor heating pipes such as for the heating of bath room floors, because of the added requirement for high flexibility.

A polymer composition for pipes e.g. like that according to WO 00/01765 above, which is suitable for a cold water pipe is therefore not necessarily useful as a composition for pipes for hot fluids where the temperature of the fluid (usually water) could be 30-40° C. higher or more.

Up to now polyolefine pipes for hot fluids such as hot water have usually not been made of polyethylene polymers due to the fact that these materials are relatively prone to stress cracking at elevated temperatures when subjected to stress. Further, to sustain pressures usually used in hot water systems high density polyethylenes have to be used and these are not suitable for pipes with high flexibility such as hot water pipes for floor heating.

It would be desirable to achieve a pipe of polyethylene that fulfils the temperature and pressure as well as the flexibility requirements for a hot water pipe.

SUMMARY OF THE INVENTION

It has now been discovered that the above mentioned problems of the present polymer pipes for hot fluids such as hot water, may be eliminated or alleviated and that the above mentioned objective may be achieved by making the pipe of a multimodal polyethylene.

Thus, the present invention provides a polymer pipe for hot fluids, characterised in that it comprises a multimodal polyethylene with a high molecular weight (HMW) fraction and a low molecular weight (LMW) fraction where said HMW fraction has a density of at least 0.920 g/cm$^3$, and that the multimodal polyethylene has a density of 0.921-0.950 g/cm$^3$ and has a time to failure at 95° C. and 3.6 MPa of at least 165 h determined according to DIN 16 833 and a modulus of elasticity of at most 900 MPa determined according to ISO 527-2/1B.

Other distinguishing features and advantages of the invention will appear from the following specification and the appended claims.

DETAILED DESCRIPTION OF THE INVENTION

Although, for reasons of convenience the pipe for hot fluids according to the present invention will be described below with reference to a pipe for hot water ("a hot water pipe") the invention should not be construed as limited thereto.

As stated above, the pipe of the present invention is made from a multimodal polyethylene. This is in contrast to prior art hot water pipes which usually are made of cross-linked unimodal polyethylene, polypropylene, polyvinylchloride or polybutylene.

The "modality" of a polymer refers to the form of its molecular weight distribution curve, i.e. the appearance of the graph of the polymer weight fraction as function of its molecular weight. If the polymer is produced in a sequential step process, utilizing reactors coupled in series and using different conditions in each reactor, the different fractions produced in the different reactors will each have their own molecular weight distribution. When the molecular weight distribution curves from these fractions are superimposed into the molecular weight distribution curve for the total resulting polymer product, that curve will show two or more maxima or at least be distinctly broadened in comparison with the curves for the individual fractions. Such a polymer product, produced in two or more serial steps, is called bimodal or multimodal depending on the number of steps. In the following all polymers thus produced in two or more sequential steps are called "multimodal". It is to be noted here that also the chemical compositions of the different fractions may be different. Thus one or more fractions may consist of an ethylene copolymer, while one or more others may consist of ethylene homopolymer.

By properly selecting the different polymer fractions and the proportions thereof in the multimodal polyethylene a pipe with inter alia enhanced processability can be obtained.

The pipe of the present invention is made of a multimodal polyethylene, preferably a bimodal polyethylene. The multimodal polyethylene comprises a low molecular weight (LMW) polyethylene fraction, preferably an ethylene homopolymer fraction and a high molecular weight (HMW) polyethylene fraction, preferably an ethylene copolymer fraction. Depending on whether the multimodal polyethylene is bimodal or has a higher modality the LMW and HMW fractions may comprise only one fraction each or include sub-fractions, i.e. the LMW may comprise two or more LMW sub-fractions and similarly the HMW fraction may comprise two or more HMW sub-fractions. As indicated above, it is preferred that the LMW fraction is an ethylene homopolymer and that the HMW fraction is an ethylene copolymer. As a matter of definition, the expression "ethylene homopolymer" used herein relates to an ethylene polymer that consists substantially, i.e. to at least 97% by weight, preferably at least 99% by weight, more preferably at least 99.5% by weight, and most preferably at least 99.8% by weight of ethylene and thus is an HD ethylene polymer which preferably only includes ethylene monomer units.

In the present invention it is further preferred that the proportions of the LMW and HMW fractions (also known as the "split" between the fractions) are selected properly. More particularly, it is preferred that the weight ratio of the LMW fraction to the HMW fraction lies in the range (30-55):(70-45), more preferably (45-55):(55-45). Unless otherwise stated, the amount of polymer prepared in any prepolymerisation stage is included in the polymer amount prepared in the first main polymerisation stage (the LMW fraction or the HMW fraction as the case may be). It is preferred that the split lies within these ranges in order to find a good balance between e.g. physical properties and processability.

The molecular weight distribution (MWD), as defined by the ratio of the weight average molecular weight (Mw) to the number average molecular weight (Mn), i.e. Mw/Mn, of the inultimodal polyethylene of the present invention should sutiably lie in the range Mw/Mn=3-35, more preferably 5-30, and most preferably 10-25. Mn should suitably lie in the range $Mn=5-50 \times 10^3$, more preferably $7-30 \times 10^3$, and most preferably $8-27 \times 10^3$ g/mole. Mw should suitably lie in the range $Mw=100-400 \times 10^3$, more preferably $150-280 \times 10^3$, and most preferably $200-250 \times 10^3$ g/mole.

For reasons of strength and flexibility the density of the multimodal polyethylene lies in the range 0.921-0.950 g/cm$^3$, preferably 0.930-0.940 g/cm$^3$. The lower densities below 0.940 g/cm$^3$ are preferred for more flexible pipes such as pipes for floor heating.

For optimum properties of the pipe according to the invention it is also important to select the densities of the HMW and LMW fractions of the multimodal polyethylene and balance them properly against each other. It has surprisingly been discovered at the present invention that in order to optimise the performance such as the flexibility, of the pipe according to the invention the density of the HMW fraction should not lie below 0.920 g/cm$^3$ preferably not below 0.922 and in particular it should be as high as possible within the ranges defined below. Thus the HMW fraction, which preferably is an ethylene copolymer, has a density of at least 0.920 g/cm$^3$, preferably in the range 0.920-0.940 g/cm$^3$, and more preferably in the range 0.922-0.930 g/cm$^3$.

The LMW fraction which preferably is an ethylene homopolymer, preferably has a density in the range 0.955-0.975 g/cm$^3$.

The selection of a multimodal polyethylene with properties as defined herein makes it possible to achieve a pipe with improved stress crack resistance (or the so called Stage II) and hence resistance to brittle failure which in turn means that the pipe has good pressure test performance at elevated temperatures when tested according to DIN 16 833 combined with relatively high flexibility. The pressure test performance of a plastics pipe in a hoops stress vs. time to failure diagram can be divided into three parts; Stage I that is due to mechanical overload giving ductile failures, Stage III that is caused by chemical degradation and Stage II a mixed mode giving rise to mainly brittle failures (M. Ifwarson et al: Livslängd hos plaströr—Hur bestämmer man det? Studsvik/EX-90/26).

As indicated above a characteristic feature of the pipe of the invention is its flexibility. Thus, the flexibility in terms of its elasticity modulus is at most 900 MPa determined according to ISO 527-2/IB. Preferably, the elasticity modulus is 600-900 MPa, and most preferably 760-870 MPa determined according to ISO 527-2/IB. The flexibility is of particular importance when the pipe is used for floor heating.

The melt flow rate (MFR), which is equivalent to the term "melt index" previously used, is another important property of the multimodal polyethylene pipe according to the invention. The MFR is determined according to ISO 1133 and is indicated in g/10 min. The MFR is an indication of the flowability, and hence the processability, of the polymer. The higher the melt flow rate, the lower the viscosity of the polymer. The MFR is determined at different loadings such as 2 kg ($MFR_2$; ISO 1133, condition D) or 5 kg ($MFR_5$; ISO 1133, condition T). At the present invention the multimodal polyethylene preferably has an $MFR_5$ of 0.1-5 g/10 min, more preferably 0.4-1.6 g/10 min. Further, the LMW fraction should preferably have an $MFR_2$ of 1-1000 g/10 min, preferably 1-500 g/10 min, and most preferably 2-300 g/10 min.

An important characteristic of the pipe of the present invention is its pressure test resistance. Thus, the multimodal polyethylene pipe according to the invention has a pressure test resistance, as determined according to DIN 16 833 in terms of the number of hours the pipe withstands at certain pressure at a certain temperature before failure, of at least 165 h at 3.6 MPa and 95° C.

Generally, polymer pipes are manufactured by extrusion, or, to a smaller extent, by injection moulding. A conventional plant for extrusion of polymer pipes comprises an extruder, a nozzle, a calibrating device, cooling equipment, a pulling device, and a device for cutting or for coiling-up the pipe. This is a technique well known to the skilled person an no further particulars should therefore be necessary here concerning this aspect. The pipe of the present invention is preferably prepared by extrusion in an extruder.

In order to further increase the strength the pipe of the present invention may be made of a crosslinked multimodal polyethylene. Crosslinking of polyethylene is previously known. Such cross-linking can be accomplished in various ways, such as radiation cross-linking, peroxide cross-linking, cross-linking with cross-linkable groups, ionomer cross-linking, or combinations of such procedures. In radiation cross-linking, the cross-linking takes place by the plastic being irradiated with high-energy radiation, such as electron radiation, while in peroxide cross-linking, the cross-linking takes place by the addition of peroxide compounds, such as dicumyl peroxide, which form free radicals. In cross-linking with cross-linkable groups, reactive groups are inserted in the plastic, said groups reacting with each other while developing covalent bonds. A special example of such reactive groups is silane groups, which are inserted in the plastic by graft polymerisation or, preferably, copolymerisation and, in the presence of water and a silanol condensation catalyst, are hydrolysed while separating alcohol and forming silanol groups, which then react with each other by a condensation reaction while separating water. In ionomer cross-linking, the plastic contains ionisable groups, which react with polyvalent, ionic cross-linking reagents while developing ionic bonds.

The invention is not limited to a special type of cross-linking, but any suitable process which results in cross-linking of the polyethylene pipe can be used.

It is known that the physical and mechanical properties of polymer pipes can be improved by biaxial orientation of the pipe, i.e. the polymer material in the pipe is oriented in two directions which are perpendicular to one another. One of these two directions is the axial direction of orientation, i.e. the direction (direction of extrusion) in which the pipe is manufactured in the normal case, whereas the other direction is the circumferential or peripheral direction of the pipe. Thanks to biaxial orientation, a plurality of the properties of the pipe can be improved to a considerable extent, and especially the pressure strength, both for shorter and longer periods, should be mentioned.

Biaxial orientation of the pipe should be combined with crosslinking thereof as described e.g. in WO 97/19807.

Before orientation, the pipe suitably has a degree of cross-linking of at least about 10% and also suitably a degree of cross-linking of at most about 90%. In this range, i.e. about 10-90%, preferably about 20-50% degree of cross-linking, a suitable degree of cross-linking is selected on the one hand on the basis of the appearance of the stress-strain curve in the peripheral direction and, if applicable, in the axial direction, thereby avoiding a marked maximum and, on the other hand, so as to obtain an elongation at break which is sufficient for the orientation procedure.

When the pipe has been oriented biaxially, the biaxially oriented structure is "locked" by cooling the pipe. In order to obtain a reinforcement of the pipe, it is assumed that the biaxially oriented pipe is prevented from returning completely to the state existing before the orientation procedure. For additional locking of the structure and counteracting any risk of relaxation of the orientation, for instance when heating the plastic pipe, it is especially preferred to cross-link the pipe additionally after the biaxial orientation. As a rule, the subsequent cross-linking can proceed to the maximum degree of cross-linking of the material involved.

The cross-linking of the plastic pipe thus is begun before the biaxial orientation and suitably after the extrusion of the pipe, preferably immediately before the peripheral orientation. A cross-linking station for accomplishing cross-linking in one of the ways previously described thus is arranged between the extruder and the device for peripheral orientation of the pipe. If subsequent cross-linking of the pipe is carried out in order to achieve additional locking of the structure, as is especially preferred, a subsequent cross-linking station may be arranged after the device for peripheral orientation of the pipe and preferably after, or in connection with, the subsequent cooling device.

It is emphasised that the cross-linking can also be carried out as a continuous process, in which case the cross-linking is begun before the orientation of the pipe and continues during the actual orientation procedure so as to be completed only after completing the orientation.

It is previously known to produce multimodal, in particular bimodal, olefin polymers, such as multimodal polyethylene, in two or more reactors connected in series. As instance of this prior art, mention may be made of EP 517 868, which is hereby incorporated by way of reference as regards the production of multimodal polymers.

According to the present invention, the main polymerisation stages are preferably carried out as a combination of slurry polymerisation/gas-phase polymerisation. The slurry polymerisation is preferably performed in a so-called loop reactor. The use of slurry polymerisation in a stirred-tank reactor is not preferred in the present invention, since such a method is less flexible and involves solubility problems. For this reason, it is preferred that the multimodal polyethylene is produced in two main polymerisation stages in a combination of loop reactor/gas-phase reactor. Optionally and advantageously, the main polymerisation stages may be preceded by a prepolymerisation, in which case up to 20% by weight, preferably 1-10% by weight, more preferably 1-5% by weight, of the total amount of polymers is produced. The prepolymer is preferably an ethylene homopolymer (HDPE). At the prepolymerisation all of the catalyst is preferably charged into a loop reactor and the prepolymerisation is performed as a slurry polymerisation. Such a prepolymerisation leads to less fine particles being produced in the following reactors and to a more homogeneous product being obtained in the end. Generally, this technique results in a multimodal polymer blend through polymerisation with the aid of a Ziegler-Natta or a single site catalyst such as a metallocene catalyst in several successive polymerisation reactors. In the production of a bimodal polyethylene, which according to the invention is the preferred polymer, a first ethylene polymer is produced in a first reactor under certain conditions with respect to hydrogen-gas pressure, temperature, pressure, and so forth. After the polymerisation in the first reactor, the reaction mixture including the polymer produced is introduced into a flash stage where the hydrocarbons are separated from the polymer so that at least hydrogen is removed. The polymer, optionally with some heavier hydrocarbons such as diluent, is fed to a second reactor, where further polymerisation takes place by addition of ethylene and optionally comonomer and/or hydrogen. Usually, a first polymer of high melt flow rate (low molecular weight, LMW) and with no addition of comonomer is produced in the first reactor, whereas a second polymer of low melt flow rate (high molecular weight, HMW) and with addition of comonomer is produced in the second reactor. As comonomer various alpha-olefins with 3-8 carbon atoms may be used, but the comonomer is preferably selected from the group consisting of 1-butene, 1-hexene, 4-methyl-1-pentene, and 1-octene. Also, polyunsaturated monomers useful in providing cross-linkability to the polymer, may be used as comonomers. Such polyunsaturated comonomers generally consist of monomers which are copolymerisable with ethylene and have 8-14 carbon atoms and at least two non-conjugated double bonds, of which at least one is terminal. The polyunsatured comonomer may have a branched or, which is preferred, a straight chain, and it may contain substituents that do not interfere with the polymerisation, but is preferably unsubstituted. The most preferred polyunsaturated comonomers are α,ω-alkadienes having 8-14 carbon atoms, more specifically unsubstituted straight-chain α,ω-alkadienes having 8-14 carbon atoms,. and in particular 1,7-octadiene, 1,9-decadiene and 1,13-tetradecadiene.

Also, for cross-linking purposes unsaturated silane monomers may be used as comonomers. Preferably, such unsaturated silane monomers may be represented by the formula $$RSiR'_n Y_{3-n}$$

wherein

R is an ethylenically unsaturated hydrocarbyl, hydrocarbyloxy or (meth)acryloxy hydrocarbyl group, R' is an aliphatic saturated hydrocarbyl group, Y which may be same of different, is a hydrolysable organic group, and n is 0, 1 or 2.

If there is more than one Y group, these do not have to be identical.

Specific examples of the unsaturated silane compound are those wherein R is vinyl, allyl, isopropenyl, butenyl, cyclohexenyl or gamma-(meth)acyloxy propyl; Y is methoxy, ethoxy, formyloxy, acetoxy, propionyloxy or an alkyl- or arylamino group; and R', if present, is a methyl, ethyl, propyl, decyl or phenyl group.

A preferred unsaturated silane compound is represented by the formula $$CH_2\!\!=\!\!CHSi(OA)_3$$

wherein A is a hydrocarbyl group having 1-8 carbon atoms, preferably 1-4 carbon atoms.

The most preferred compounds are vinyl trimethoxysilane, vinyl triethoxysilane, gamma-(meth)acryloxypropyltrimethoxisilane and vinyl triacetoxysilane or combinations of two or more thereof.

The amount of comonomer is preferably such that it comprises 0.4-3.5 mol %, more preferably 0.7-2.5 mol % of the multimodal polyethylene. The resulting end product consists of an intimate mixture of the polymers from the two reactors, the different molecular-weight-distribution curves of these polymers together forming a molecular-weight-distribution curve having a broad maximum or two maxima, i.e. the end product is a bimodal polymer blend. Since multimodal, and especially bimodal, ethylene polymers, and the production thereof belong to the prior art, no detailed description is called for here, but reference is had to the above mentioned EP 517 868.

As hinted above, it is preferred that the multimodal polyethylene according to the invention is a bimodal polymer mixture. It is also preferred that this bimodal polymer blend has been produced by polymerisation as above under different polymerisation conditions in two or more polymerisation reactors connected in series. Owing to the flexibility with respect to reaction conditions thus obtained, it is most preferred that the polymerisation is carried out in a loop reactor/a gas-phase reactor. Preferably, the polymerisation conditions in the preferred two-stage method are so chosen that a comparatively low-molecular-weight polymer having no content of comonomer is produced in one stage, preferably the first stage, owing to a high content of chain-transfer agent (hydrogen gas), whereas a high-molecular-weight polymer having a content of comonomer is produced in another stage, preferably the second stage. The order of these stages may, however, be reversed.

In the preferred embodiment of the polymerisation in a loop reactor followed by a gas-phase reactor, the polymerisation temperature in the loop reactor preferably is 92-98° C., more preferably about 95° C., and the temperature in the gas-phase reactor preferably is 75-90° C., more preferably 80-85° C.

A chain-transfer agent, preferably hydrogen, is added as required to the reactors, and preferably 350-450 moles of $H_2$/kmoles of ethylene are added to the reactor producing the LMW fraction and 20-40 moles of $H_2$/kmoles of ethylene are added to the reactor producing the HMW fraction.

As indicated earlier, the catalyst for polymerising the multimodal polyethylene of the invention preferably is a Ziegler-Natta or single site type catalyst. Particularly preferred are catalysts with a high overall activity as well as a good activity balance over a wide range of hydrogen partial pressures. As an example hereof may be mentioned the catalysts disclosed in EP 688794 and in FI 980788. Such catalysts also have the advantage that the catalyst (procatalyst and cocatalyst) only needs to and, indeed, only should be added in the first polymerisation reactor.

Although the invention has been described above with reference to a specified multimodal polyethylene, it should be understood that this multimodal polyethylene may include various additives such as fillers, antioxidants, UV-stabilisers, processing aids, etc. as is known and conventional in the art. Further, the pipe made of the specified multimodal polyethylene may be a single-layer pipe or form part of a multilayer pipe including further layers of other pipe materials.

In order to further facilitate the understanding of the invention, it will now be illustrated by way of non-limiting examples of pipes according to preferred embodiments of the invention as well as comparative examples of pipes outside the invention.

EXAMPLE 1

Pipes of eight different polyethylenes were made. Each pipe had an outer diameter of 32 mm and a wall thickness of 3 mm.

Pipe No. 1 (comparative) was made of unimodal polyethylene, whereas pipes nos. 2-8, were made of bimodal polyethylene. Pipes nos. 2-3 are comparative pipes outside the invention, whereas pipes nos. 4-8 are in accordance with the present invention. The LMW fractions of the bimodal polyethylenes were ethylene homopolymers, except for pipe nos. 5, 6 and 7, which included 1-butene as a comonomer. The HMW fractions of the bimodal polyethylenes were all ethylene/1-butene copolymers. The amount of 1-butene in all the bimodal polyethylenes of pipe nos. 2-8 were 2-2.4% by weight.

Each pipe was pressure tested according to DIN 16 833 at 3.6 MPa and 95° C. and the time to failure in hours (h) determined. The requirement according to DIN 16 833 is a time to failure of at least 165 h. The results of the pressure testing are also shown in Table 1.

The E-modulus of each pipe was tested according to ISO 527-2/1B. The results appear from Table 1.

TABLE 1

| Parameter | Pipe no. | | | | | | | |
| --- | --- | --- | --- | --- | --- | --- | --- | --- |
| | 1 | 2 | 3 | 4 | 5 | 6 | 7 | 8 |
| Comparative/Invention | Comp | Comp | Comp | Inv | Inv | Inv | Inv | Inv |
| Unimodal | X | | | | | | | |
| Bimodal | | X | X | X | X | X | X | X |
| Density: | | | | | | | | |
| Final | 0.939 | 0.939 | 0.940 | 0.940 | 0.939 | 0.940 | 0.942 | 0.943 |
| HMW fraction | — | 0.916 | 0.915 | 0.924 | 0.923 | 0.923 | 0.928 | 0.927 |
| $MFR_5$ (final) | 0.6 | 0.64 | 0.85 | 0.76 | 0.61 | 0.39 | 0.45 | 0.35 |

TABLE 1-continued

| Parameter | Pipe no. | | | | | | | |
|---|---|---|---|---|---|---|---|---|
| | 1 | 2 | 3 | 4 | 5 | 6 | 7 | 8 |
| MFR$_2$ (LMW) | — | 290 | 500 | 2 | 9 | 11 | 300 | 290 |
| DIN 16 833 (h) | fails | 0.25 | 13 | 234 | 5900 (R) | 5900 (R) | 5900 (R) | 5900 (R) |
| E-modulus (MPa) | 760 | 817 | 887 | 826 | 776 | 812 | 868 | 827 |

Notes:
(a) The values of the density of the HMW fraction are calculated values estimated from the final density and the density of the polymer fraction made in the first reactor.
(b) "(R)" denotes that the test is still running and that the pipe has not failed after the indicated time.

It is evident from a study of Table 1 that Pipe no. 1 (unimodal polyethylene) does not fulfil the requirement of DIN 16 833 for a hot water pipe. Further, pipes no. 2-3 which are made of a bimodal polyethylene suitable for cold water pipes, do not fulfil the requirement of DIN 16 833 for a hot water pipe either. Further, pipes nos. 2-3 which are pipes of bimodal polyethylene, but have a density of the HMW fraction below the defined lower limit of 0.920 g/cm³ do not fulfil this requirement either. Pipes nos. 4-8, however, which are made of bimodal polyethylene according to the present invention, fulfil the requirement of DIN 16 833. These pipes are suitable for hot water pipes and in particular flexible hot water pipes. This shows that not only should the final bimodal polymer have a suitable density, but in addition the densities of the LMW and HMW fractions should be properly selected and balanced against each other. In particular, the density of the HMW fraction should not be too low, and preferably it should be at least 0.920 g/cm³, more preferably at least 0.922 g/cm³. When the density of the HMW fraction is increased, the density of the LMW fraction must be decreased correspondingly to maintain the desired density of the final multimodal polyethylene. This is e.g. done by decreasing the MFR$_2$ of the LMW fraction. Thus, if the MFR$_2$ of the LMW fraction is decreased from about 300 g/10 min to about 2 g/10 min, the density is decreased from 0.974 g/cm³ to 0.964 g/cm³.

The invention claimed is:

1. A polymer pipe for hot fluids, comprising a multimodal polyethylene comprising:
   a high molecular weight (HMW) fraction, and
   a low molecular weight (LMW) fraction,
   wherein said HMW fraction has a density of 0.922-0.930 g/cm³ and said LMW fraction has a density of 0.955-0.975 g/cm³, the multimodal polyethylene having:
   a density of 0.921-0.950 g/cm³,
   a time to failure at 95° C. and 3.6 MPa of at least 165 h determined according to DIN 16 833, and
   a modulus of elasticity of at most 900 MPa determined according to ISO 527-2/1B, and wherein the polymer pipe is in the form of a pipe and is constructed to convey water at a temperature of at least 60° C.

2. A pipe as claimed in claim 1, wherein the HMW fraction is an ethylene copolymer.

3. A pipe as claimed in claim 2, wherein the HMW fraction is a copolymer of ethylene and a comonomer selected from the group consisting of 1-butene, 1-hexene, 4-methyl-1-pentene, and 1-octene.

4. A pipe as claimed in claim 1, wherein the LMW fraction has an MFR$_2$=1-1000 g/$^{10}$ min.

5. A pipe as claimed in claim 1, wherein the weight ratio between the LMW fraction and the HMW fraction lies in the range from 30:70 to 55:45.

6. A pipe as claimed in claim 1, wherein the multimodal polyethylene has a density of 0.921-0.950 g/cm³, the LMW fraction is an ethylene homopolymer with a density of 0.955-0.975 g/cm³, and the HMW fraction is an ethylene copolymer with a density of 0.922-0.930 g/cm³, the weight ratio of the LMW fraction to the HMW fraction being from 30:70 to 55:45.

7. A pipe as claimed in claim 1, wherein the pipe is a floor heating pipe.

* * * * *